UNITED STATES PATENT OFFICE.

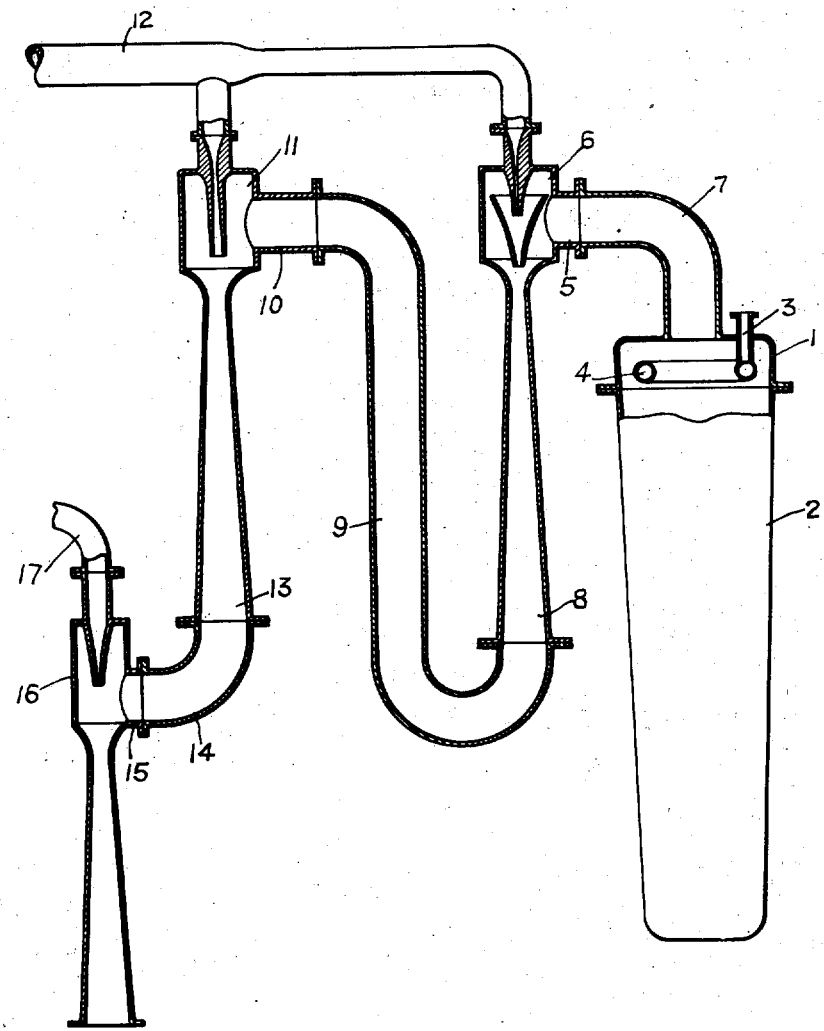

MAURICE LEBLANC, OF PARIS, FRANCE.

REFRIGERATING-MACHINE.

1,029,201.  Specification of Letters Patent.  Patented June 11, 1912.

Original application filed February 15, 1905, Serial No. 245,719. Divided and this application filed September 27, 1910. Serial No. 583,991.

*To all whom it may concern:*

Be it known that I, MAURICE LEBLANC, a citizen of the Republic of France, residing at Villa Montmorency, Auteuil, Paris, France, have made a new and useful Invention in Refrigerating-Machines, of which the following is a specification, this application being a division of an application filed by me on February 15, 1905, serially numbered 245,719.

This invention relates to refrigerating apparatus of the kind in which liquid is cooled or frozen by being partially evaporated in a chamber or receptacle in which a vacuum is maintained.

An object of this invention is to provide a refrigerating apparatus which will operate with an efficiency hitherto unattainable.

This and other objects I attain by means of an apparatus embodying the features herein described, and illustrated in the drawings accompanying this application and forming a part thereof.

In the drawings, I have illustrated diagrammatically, partially in section and partially in elevation, a refrigerating machine embodying my invention.

The apparatus illustrated consists of a refrigerating chamber, a series of fluid actuated ejectors operating in tandem, and a condenser adapted to receiv the fluid discharged by the ejectors.

The refrigerating chamber illustrated, consists of a stationary head 1 and a removable mold 2 adapted to receive the liquid to be cooled or frozen. The mold 2 may be temporarily secured to the stationary head by any suitable means which provide for a fluid tight joint between the mold and the head. The liquid to be frozen, which will be hereinafter referred to as water, for convenience of description, is preferably introduced into the mold 2 in the form of spray from a suitable and controllable source of supply, through an inlet pipe 3, which projects through the stationary head 1. The pipe 3 preferably terminates in a pipe ring or rose 4 provided with a series of holes from which the water falls drop by drop or in a thin stream.

The refrigerating chamber communicates with the inlet 5 of a fluid ejector 6 by means of suitable piping 7 which communicates with a port, provided in the head portion 1. The outlet or discharge port 8 of the ejector 6 communicates, through piping 9, with the inlet 10 of a fluid ejector 11. Both the fluid ejectors 6 and 11 are preferably operated by steam which may be delivered through a common delivery pipe 12, communicating with a suitable source of fluid or steam supply.

The outlet or discharge port 13 of the ejector 11 communicates by means of a pipe or piping 14 with the inlet 15 of a suitable condenser, for example, a jet condenser 16 the condensing liquid of which, for example water, is derived from a suitable source of supply through a pipe 17. The operation of the apparatus is as follows:

When a vacuum, or a partial vacuum, is created in the refrigerating chamber or in the head portion 1 and the mold 2, by the combined action of the ejectors 6 and 11, the water, slowly introduced through the ring 4, is partially evaporated, thereby causing a fall in temperature in the refrigerating chamber which cools or freezes the remainder of the water falling into the mold 2. The vapor given off by the water is meanwhile exhausted by the ejector 6 and the operating fluid of this ejector together with the vapor withdrawn from the refrigerating chamber is exhausted by the ejector 11. All of the fluid delivered to the series of ejectors employed and all of the vapor withdrawn from the refrigerating-chamber by the ejectors is discharged into the condenser 16, and is then condensed.

When the condensing water is plentiful and the temperature is low, so that a high degree of vacuum can be obtained in the condenser 16 the series of fluid actuated ejectors, may be operated by an elastic fluid, such as steam, at atmospheric pressure. The condenser 16 may be provided with auxiliary means for maintaining a vacuum, if the degree of vacuum obtained is not sufficient.

What I claim is:

1. A freezing machine, comprising a refrigerating chamber, a series of fluid actuated ejectors communicating therewith and operating in tandem, and a condenser communicating with the last ejector of the series.

2. A freezing machine, comprising a refrigerating chamber, a primary fluid ejector communicating with said chamber and adapted to exhaust fluid therefrom, secondary fluid ejector receiving the fluid discharged from said primary ejector, and a condenser communicating with the exhaust of the secondary ejector.

3. A freezing machine comprising a refrigerating chamber, a primary fluid actuated ejector communicating therewith and adapted to exhaust fluid therefrom, a secondary fluid actuated ejector receiving the fluid discharged from said primary ejector, and a condenser communicating with the exhaust of the secondary ejector and receiving the fluid discharged therefrom.

4. A freezing machine comprising a refrigerating chamber, a primary fluid ejector communicating therewith, a secondary fluid ejector receiving the fluid discharged from said primary ejector, a condenser communicating with the exhaust of the secondary ejector and receiving the fluid discharged therefrom, and means for admitting a stream of liquid to said refrigerating chamber.

5. A freezing machine comprising a refrigerating chamber, means for introducing a flow of water to be cooled or frozen into said chamber, a steam actuated ejector communicating with said chamber and adapted to create a vacuum therein, a second steam actuated ejector communicating with the exhaust of the first ejector and receiving the steam and vapor exhausted therefrom, and a jet condenser communicating with the exhaust of said second ejector and receiving all the fluid discharged therefrom.

In testimony whereof, I have hereunto subscribed my name this 13th day of September, 1910.

MAURICE LEBLANC.

Witnesses:
DEAN B. MASON,
P. LEBLANC.

---

It is hereby certified that Letters Patent No. 1,029,201, granted June 11, 1912, upon the application of Maurice Leblanc, of Paris, France, for an improvement in "Refrigerating-Machines," were erroneously issued to the inventor, said Leblanc, whereas said Letters Patent should have been issued to *Societe Anonyme pour l'Exploitation des Procedes Westinghouse-Leblanc, of Paris, France*, said corporation being sole owner of said invention; and that the said Letters Patent should be read with this correction therein that the same may conform to the record of the case in the Patent Office.

Signed and sealed this 23rd day of July, A. D., 1912.

[SEAL.]

C. C. BILLINGS,
*Acting Commissioner of Patents.* adapted to exhaust fluid therefrom, secondary fluid ejector receiving the fluid discharged from said primary ejector, and a condenser communicating with the exhaust of the secondary ejector.

3. A freezing machine comprising a refrigerating chamber, a primary fluid actuated ejector communicating therewith and adapted to exhaust fluid therefrom, a secondary fluid actuated ejector receiving the fluid discharged from said primary ejector, and a condenser communicating with the exhaust of the secondary ejector and receiving the fluid discharged therefrom.

4. A freezing machine comprising a refrigerating chamber, a primary fluid ejector communicating therewith, a secondary fluid ejector receiving the fluid discharged from said primary ejector, a condenser communicating with the exhaust of the secondary ejector and receiving the fluid discharged therefrom, and means for admitting a stream of liquid to said refrigerating chamber.

5. A freezing machine comprising a refrigerating chamber, means for introducing a flow of water to be cooled or frozen into said chamber, a steam actuated ejector communicating with said chamber and adapted to create a vacuum therein, a second steam actuated ejector communicating with the exhaust of the first ejector and receiving the steam and vapor exhausted therefrom, and a jet condenser communicating with the exhaust of said second ejector and receiving all the fluid discharged therefrom.

In testimony whereof, I have hereunto subscribed my name this 13th day of September, 1910.

MAURICE LEBLANC.

Witnesses:
DEAN B. MASON,
P. LEBLANC.

---

Correction in Letters Patent No. 1,029,201.

It is hereby certified that Letters Patent No. 1,029,201, granted June 11, 1912, upon the application of Maurice Leblanc, of Paris, France, for an improvement in "Refrigerating-Machines," were erroneously issued to the inventor, said Leblanc, whereas said Letters Patent should have been issued to *Societe Anonyme pour l'Exploitation des Procedes Westinghouse-Leblanc, of Paris, France*, said corporation being sole owner of said invention; and that the said Letters Patent should be read with this correction therein that the same may conform to the record of the case in the Patent Office.

Signed and sealed this 23rd day of July, A. D., 1912.

[SEAL.]

C. C. BILLINGS,
*Acting Commissioner of Patents.*

It is hereby certified that Letters Patent No. 1,029,201, granted June 11, 1912, upon the application of Maurice Leblanc, of Paris, France, for an improvement in "Refrigerating-Machines," were erroneously issued to the inventor, said Leblanc, whereas said Letters Patent should have been issued to *Societe Anonyme pour l'Exploitation des Procedes Westinghouse-Leblanc, of Paris, France*, said corporation being sole owner of said invention; and that the said Letters Patent should be read with this correction therein that the same may conform to the record of the case in the Patent Office.

Signed and sealed this 23rd day of July, A. D., 1912.

[SEAL.]

C. C. BILLINGS,

*Acting Commissioner of Patents.*